US010992496B2

(12) United States Patent
Banerjee et al.

(10) Patent No.: US 10,992,496 B2
(45) Date of Patent: Apr. 27, 2021

(54) TUNING TCP LARGESEND PARAMETER IN VXLAN CLOUD ENVIRONMENTS

(71) Applicant: International Business Machines Corporation, Armonk, NY (US)

(72) Inventors: Dwip N. Banerjee, Austin, TX (US); David Richard Marquardt, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 23 days.

(21) Appl. No.: 16/411,918

(22) Filed: May 14, 2019

(65) Prior Publication Data

US 2020/0366527 A1   Nov. 19, 2020

(51) Int. Cl.
| | | |
|---|---|---|
| H04L 29/06 | (2006.01) | |
| H04L 12/46 | (2006.01) | |
| G06F 9/455 | (2018.01) | |
| H04L 12/715 | (2013.01) | |

(52) U.S. Cl.
CPC ...... H04L 12/4641 (2013.01); G06F 9/45558 (2013.01); H04L 12/4633 (2013.01); H04L 45/64 (2013.01); H04L 69/163 (2013.01); G06F 2009/45595 (2013.01)

(58) Field of Classification Search
CPC ..... H04L 69/16; H04L 69/161; H04L 69/162; H04L 69/163; H04L 29/06102; H04L 29/06115; H04L 12/4641; H04L 45/64; H04L 12/4633
See application file for complete search history.

(56) References Cited

U.S. PATENT DOCUMENTS

| | | | |
|---|---|---|---|
| 9,866,409 B2 | 1/2018 | Sigoure et al. | |
| 2011/0321039 A1* | 12/2011 | De Leon, III et al. | G06F 9/455 718/1 |
| 2016/0261496 A1 | 9/2016 | Chang | |
| 2016/0285977 A1* | 9/2016 | Ng et al. | H04L 67/142 |
| 2017/0170986 A1* | 6/2017 | Kumar et al. | H04L 12/4633 |
| 2017/0317850 A1 | 11/2017 | Huang et al. | |

(Continued)

FOREIGN PATENT DOCUMENTS

| | | |
|---|---|---|
| CN | 108270878 A | 7/2018 |
| WO | 2016062106 A1 | 4/2016 |
| WO | 2017067408 A1 | 4/2017 |

OTHER PUBLICATIONS

Anonymous, Blockchain-VXLAN, IPCOM000250654D, (2017).

(Continued)

*Primary Examiner* — Hoon J Chung
(74) *Attorney, Agent, or Firm* — Garg Law Firm, PLLC; Rakesh Garg; David Quinn (57) ABSTRACT

In an embodiment, a method includes receiving, at a data processing system, a packet from a first component in a first remote network in an overlay network. In an embodiment, a method includes determining whether a largesend option is supported on a set of paths between the first component and a second component, the second component in a second remote network in the overlay network. In an embodiment, a method includes sending, responsive to determining a largesend option is supported on a subset of the set of paths, a packet on the subset of the set of paths.

18 Claims, 4 Drawing Sheets

(56) References Cited

U.S. PATENT DOCUMENTS

2018/0316600 A1* 11/2018 Renard et al. ........ H04L 45/123
2019/0158371 A1* 5/2019 Dillon ................... H04L 43/087
2019/0191014 A1* 6/2019 Zhang .................... H04L 67/28

OTHER PUBLICATIONS

Lei Xia et al., Fast VMM-based overlay networking for bridging the cloud and high performance computing. Cluster computing, 17(1), pp. 39-59, May 1, 2013.

* cited by examiner

TUNING TCP LARGESEND PARAMETER IN VXLAN CLOUD ENVIRONMENTS

TECHNICAL FIELD

The present invention relates generally to a method, system, and computer program product for reducing data traffic congestion in data communication networks. More particularly, the present invention relates to a method, system, and computer program product for tuning TCP largesend parameter in VXLan cloud environments.

BACKGROUND

A data processing environment comprises a variety of hardware, software, and firmware networking components. A physical network, also called an underlay, is a network defined using such components.

Techniques are available presently to construct a logical network, also known as a software defined network (SDN) overlay (hereinafter "overlay" or "overlay network"), from such networking components. Essentially, networking components are abstracted into corresponding logical or virtual representations, and the abstractions are used to define the overlay. In other words, an overlay is a logical network formed and operated using logical representations of underlying networking components.

Physical networks usually exist within the demarcated boundary of the data processing environment whose networking components are utilized in the physical network. Unlike a physical network, an overlay can be designed to span across one or more data processing environment. For example, while a physical network may be contained within a datacenter, an overlay may span across one or more datacenters.

As an example, a logical representation of a networking gateway can participate in an overlay, such that a function attributed to the logical representation of the networking gateway in the overlay is actually performed by the underlying networking gateway component in the underlay.

In an overlay, because the actual networking components that perform the networking functions are abstracted into logical entities representing the networking functionality offered by those components and not the actual implementations of those functionalities, something is needed to direct that networking functionality into a functioning logical network. An SDN controller is a component that manages and operates the logical networking components within an overlay.

Henceforth in this disclosure, any reference to a component within the context of an overlay is a reference to a logical or virtual representation of the component, which participates in the overlay, unless expressly distinguished where the reference is made.

A virtual machine (VM) comprises virtualized representations of real hardware, software, and firmware components available in a data processing system. The data processing system can have any number of VMs configured thereon, and utilizing any number of virtualized components therein. The data processing system is also referred to as a computing node, a compute node, a node, or a host.

In large scale data processing environments, such as in a data center, thousands of VMs can be operating on a host at any given time, and hundreds if not thousands of such hosts may be operational in the data center at the time. A virtualized data processing environment such as the described data center is often referred to as a "cloud" that provides computing resources and computing services to several clients on an as-needed basis.

SUMMARY

The illustrative embodiments provide a method, system, and computer program product. In an embodiment, a method includes receiving, at a data processing system, a packet from a first component in a first remote network in an overlay network. In an embodiment, a method includes determining whether a largesend option is supported on a set of paths between the first component and a second component, the second component in a second remote network in the overlay network. In an embodiment, a method includes sending, responsive to determining a largesend option is supported on a subset of the set of paths, a packet on the subset of the set of paths.

In an embodiment, a method includes gathering a set of configuration information for a first path of the set of paths between the first component and the second component. In an embodiment, a method includes determining a first virtual tunnel endpoint (VTEP) of the first component is on a same logical partition as a second VTEP of the second component. In an embodiment, largesend avoids segmentation of the packet.

In an embodiment, a method includes determining a second subset of the set of paths between the first component and the second component supports the largesend option, the second subset of paths being between the first component and a first VTEP. In an embodiment, a method includes sending, responsive to determining the second subset of the set of paths supports the largesend option, a second packet to a remote VTEP, the second packet indicating the second subset of paths supports the largesend option.

In an embodiment, a method includes receiving a SYN packet at a first VTEP, the SYN packet sent from a TCP connection running on a first virtual machine. In an embodiment, a method includes determining, in response to receiving the SYN packet, whether a largesend option is supported on a set of paths between the first VTEP and the TCP connection. In an embodiment, a method includes sending, in response to determining the largesend option is supported on the set of paths, a SYN-ACK packet from the first VTEP enabling the largesend option.

In an embodiment, a method includes determining a third subset of the set of paths between the second component and the remote VTEP supports the largesend option.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments used to describe the invention generally address and solve the above-described problems and other problems related to tuning TCP largesend parameter in VXLan cloud environments.

An application or system that sends a packet is hereinafter referred to as a "source" system, or simply a "source". A LAN within which the source system operates is hereinafter referred to as a "local" network. An application or system that receives a packet is hereinafter referred to as a "target" system, or simply a "target". A LAN within which the target system operates is hereinafter referred to as a "remote" network.

A reference to a "network" is a reference to a physical LAN or a virtual LAN unless specifically distinguished where used. A Virtual Extensible LAN (VXLan) uses a 24-bit segment ID known as VXLan Network Identifier to scale to 16 million logical networks. VXLan uses VXLan tunnel endpoint (VTEP) devices to map tenants' end devices to VXLan segments and to perform VXLan encapsulation and de-encapsulation. VTEPs originate and/or terminate VXLan tunnels. A reference to a "VTEP" is a reference to a physical or virtual network switch unless specifically distinguished where used. A VTEP has a unique IP address that identifies the VTEP. The VTEP uses the unique IP address to encapsulate Ethernet frames and transmits the encapsulated packets.

Largesend is the ability to send large packets down a TCP connection. Typically, when establishing a connection, two endpoints negotiate a maximum segment size (MSS). Large chunks of data are broken down into smaller segments through a process called segmentation. In virtual networks, hardware does not significantly provide constraints on packet sizes making possible the end-to-end determination of feasibility of largesend. A connection in a virtual network can use largesend packets which are transported to a peer virtual machine without any segmentation.

A source within one network (local-1 network) often has to send a data packet to a target in another network. Sometimes the other network (local-2 network) is also on the same side of the gateway as the local-1 network in which the source is operating. At other times, the other network (remote-1 network) may be on the opposite side of the gateway from the local-1 network of the source.

More than one remote networks may be reachable via their respective VPNs coupled to the VTEP. For example, remote-1 network may have a VPN tunnel "VPN1" with the VTEP, another remote network—remote-2 network—may have a VPN tunnel "VPN2" with the VTEP, and so on up to remote network—remote-n network—may have a VPN tunnel "VPNn" with the VTEP, wherein n is any number greater than 1.

The illustrative embodiments recognize that the presently available tools or solutions do not address these needs/problems or provide adequate solutions for these needs/problems. An embodiment can be implemented as a software application. The application implementing an embodiment, or one or more components thereof, can be configured as a modification of an existing VTEP—i.e., a native application in the VTEP, as an application executing in a data processing system—such as a central cloud controller device—communicating with an existing VTEP over a local area network (LAN)—i.e., a local application on the LAN, as an application executing in a data processing system communicating with an existing VTEP over a wide area network (WAN)—i.e., a remote application on the WAN, as a separate application that operates in conjunction with an existing VTEP in other ways, a standalone application, or some combination thereof.

An embodiment operates to send a SYN packet using a largesend parameter. In an embodiment, a TCP running on a virtual machine sends the SYN packet. An embodiment operates to receive the SYN packet at a VTEP. The VTEP is configured to route a packet from a source in a first remote network to a target in any of the several remote networks on the other end of several corresponding VTEPS coupling to the VTEP.

An embodiment operates to determine if largesend is supported between the source and the target. In an embodiment, an application gathers configuration information for a tunnel between a first VTEP and a second VTEP.

In an embodiment, the first VTEP determines a first virtual machine associated with the first VTEP wants to perform largesend. In an embodiment, an application sends a SYN-ACK packet on a path from the first VTEP to a TCP connection to enable largesend on the path.

The illustrative embodiments are described with respect to certain types of addresses, target codes, headers, fields or spaces, octet values, records, rules, gateways, networks, sources, targets, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
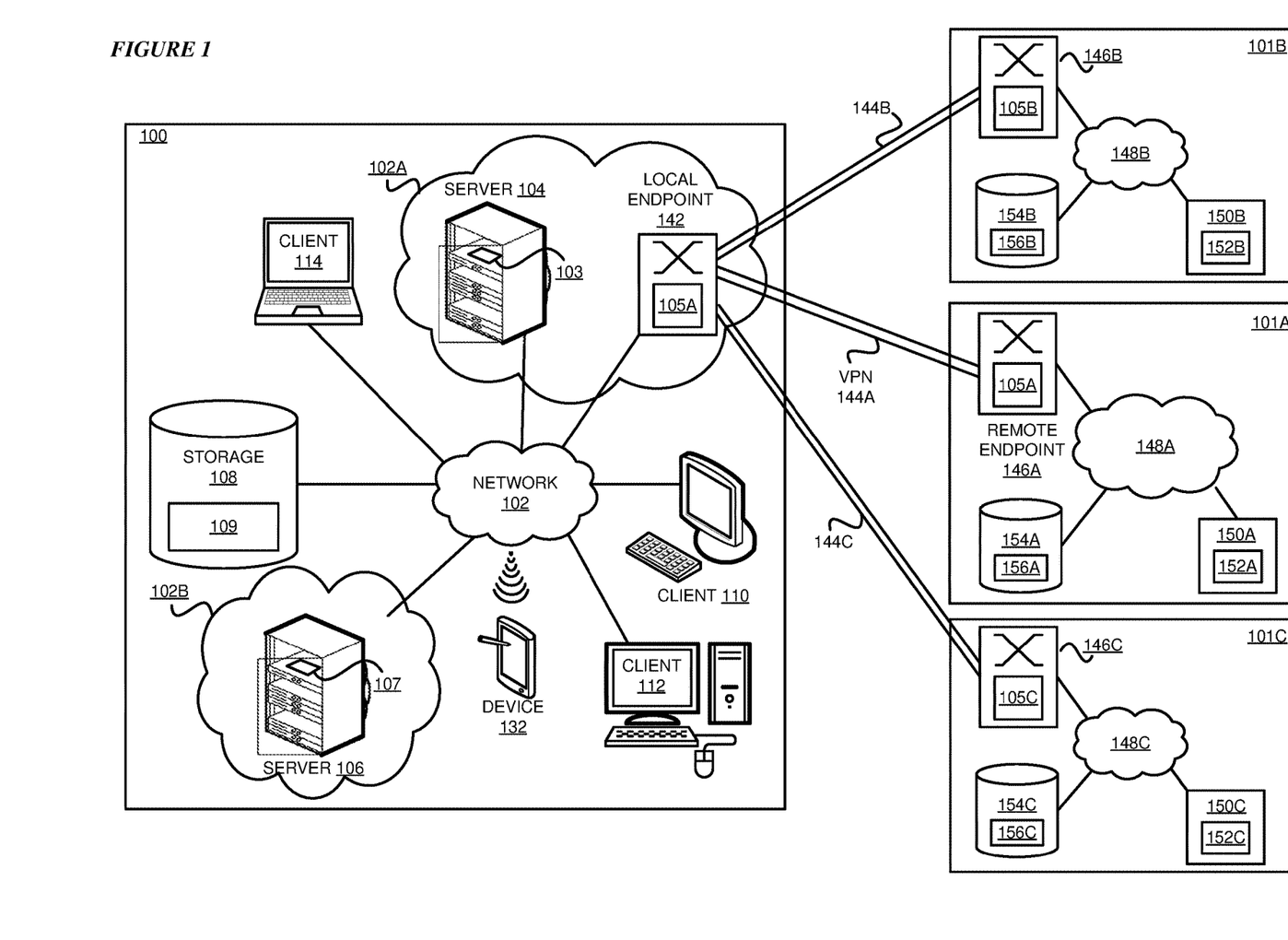
FIG. 1 depicts a block diagram of a network of data processing systems in which illustrative embodiments may be implemented.
Figure 2:
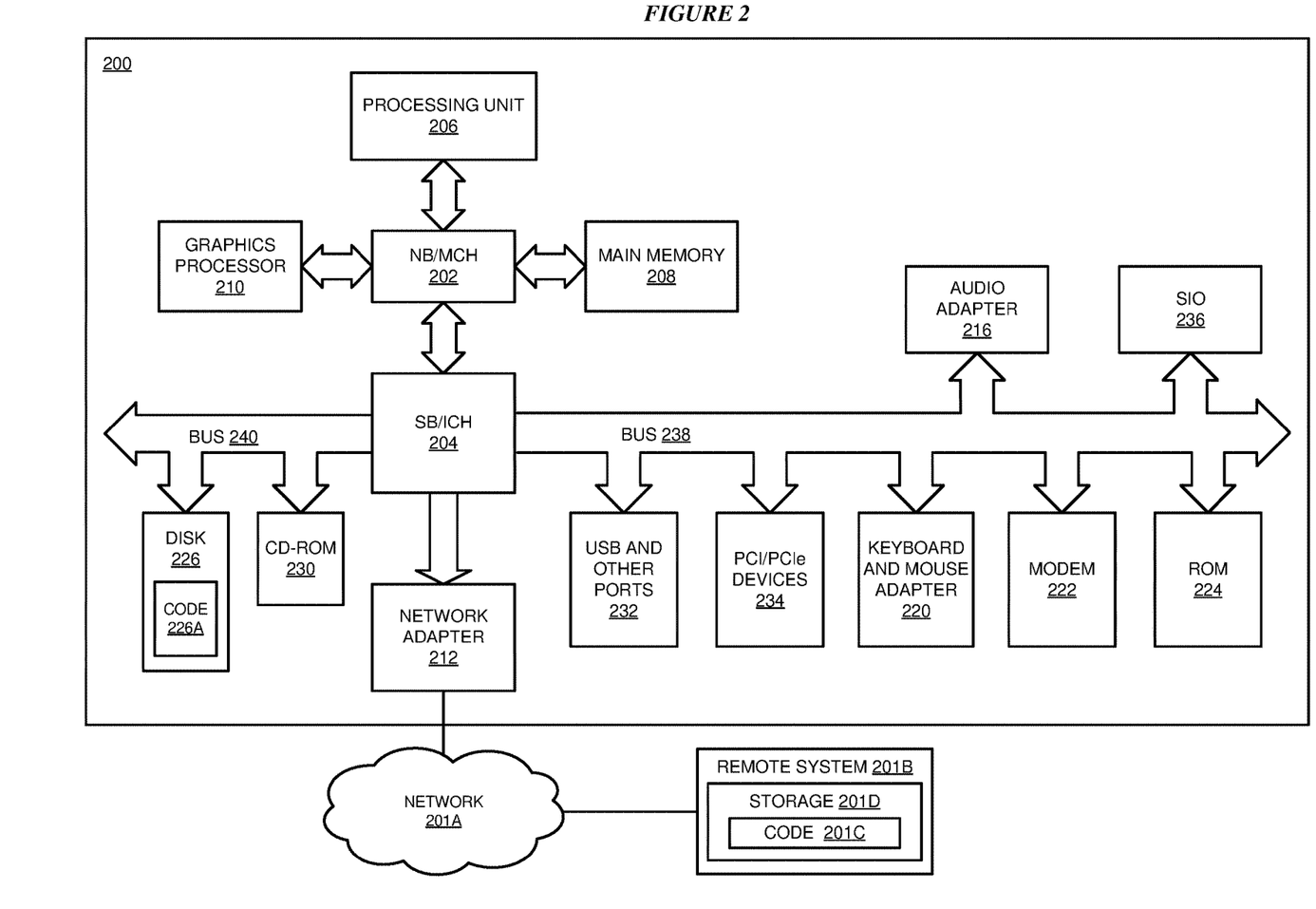
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an outbound-side embodiment described herein. Applications 105A, 105B, and 105C each implement an inbound-side embodiment described herein. Applications 105 and 105A-C can each be configured to implement both the outbound and the inbound side embodiments within the scope of the illustrative embodiments.

As an example, assume that within environment 100, application 103 is a source that exists in a local-1 network 102A and application 107 is a local target exists in a local-2 network 102B. As an example, networks 102A and 102B may be different virtual LANs within environment 100 and communication between networks 102A and 102B is enabled by a backend router (not shown). Source 103 sends packets out of local-1 network 102A via local endpoint 142. Local endpoint 142 can be implemented using a gateway as described herein. Application 105 need not necessarily be implemented within local endpoint 142 but may operate in conjunction therewith in any suitable manner as described herein.

Repository 108 stores data 109. Data 109 comprises a set of address records (or target codes in any other suitable form. Source 103 operates in local-1 network 102A. Local endpoint 142 with the functionality imparted by application 105 uses data 109 to route a packet from source 103 correctly in a manner described herein.

Within environment 101A, application 152A is a remote target in remote network 148A. Target 152A in system 150A on remote network 148A receives data packets from source 103 over VPN 144A via remote endpoint 146A. Remote endpoint 146A can be implemented using a VTEP as described herein. Application 105A need not necessarily be implemented within remote endpoint 146A but may operate in conjunction therewith in any suitable manner as described herein.

Repository 154A stores data 156A. Remote endpoint 146A with the functionality imparted by application 105A uses data 156A to route a packet to target 152A correctly in a manner described herein. Data 156A in repository 154A includes a set of address records (or target codes in any other suitable form).

Environments 101B and 101C are also configured as remote networks in the manner of environment 101A. Only three example remote environments are depicted for the clarity of the figures. Any number of remote environments can be similarly implemented.

Within environment 101B, application 152B is a remote target in remote network 148B. Target 152B in system 150B on remote network 148B receives data packets from source 103 over VPN 144B via remote endpoint 146B. Remote endpoint 146B can be implemented using a VTEP as described herein. Application 105B need not necessarily be implemented within remote endpoint 146B but may operate in conjunction therewith in any suitable manner as described herein.

Repository 154B stores data 156B. Remote endpoint 146B with the functionality imparted by application 105B uses data 156B to route a packet to target 152B correctly in a manner described herein. Data 156B in repository 154B may also include a set of address records (or target codes in any other suitable form).

Within environment 101C, application 152C is a remote target in remote network 148C. Target 152C in system 150C on remote network 148C receives data packets from source 103 over VPN 144C via remote endpoint 146C. Remote endpoint 146C can be implemented using a VTEP as described herein. Application 105C need not necessarily be implemented within remote endpoint 146C but may operate in conjunction therewith in any suitable manner as described herein.

Repository 154C stores data 156C. Remote endpoint 146C with the functionality imparted by application 105C uses data 156C to route a packet to target 152C correctly in a manner described herein. Data 156C in repository 154C may also include a set of address records (or target codes in any other suitable form).

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 and 105A-C in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
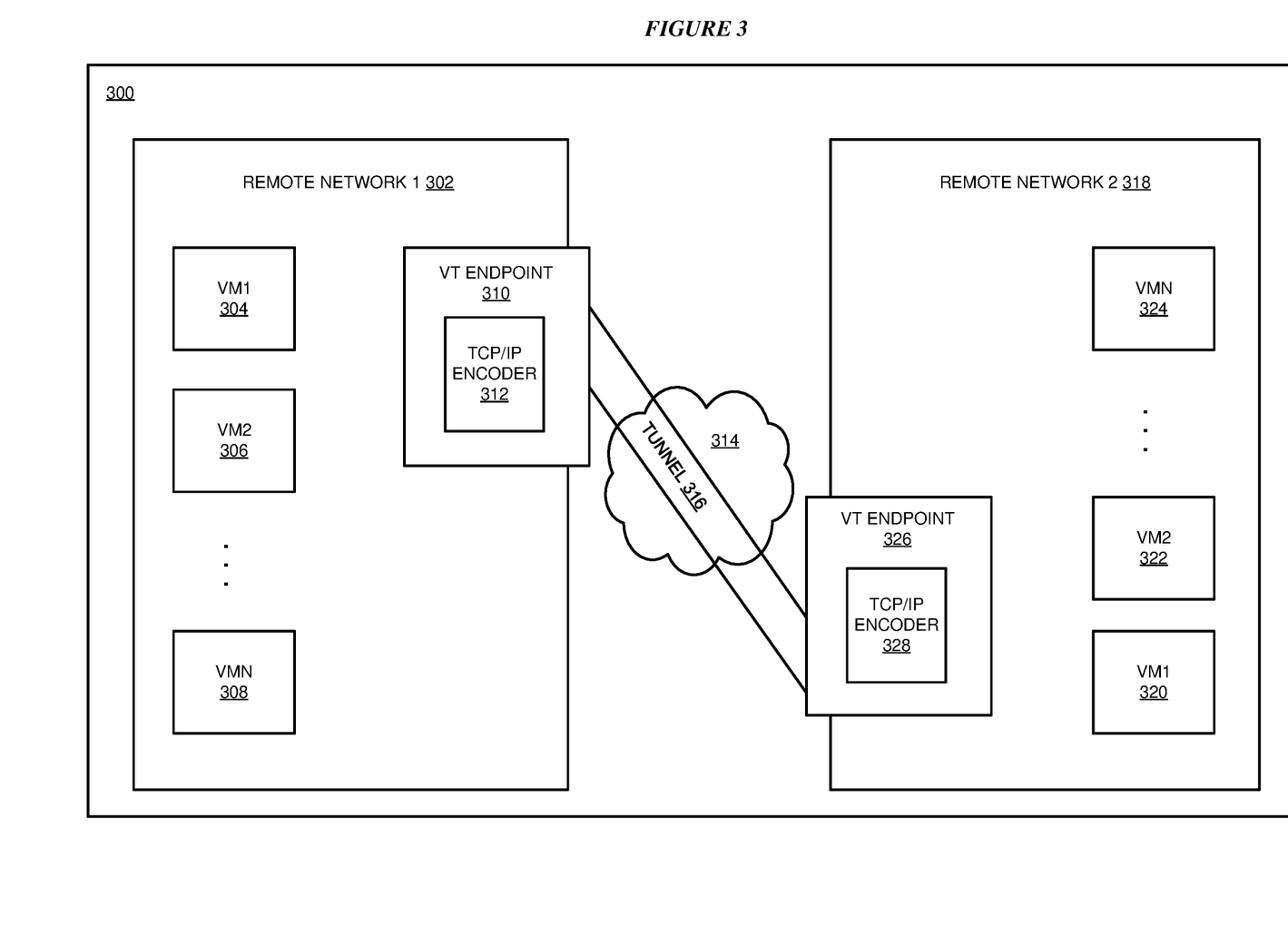
FIG. 3 depicts a block diagram of an example configuration for tuning TCP largesend parameter in VXLan cloud environments in accordance with an illustrative embodiment.

With reference to FIG. 3, this figure depicts a block diagram of an example configuration for tuning TCP largesend parameter in VXLan cloud environments in accordance with an illustrative embodiment. Remote network 1 302 in configuration 300 is an example of remote network 148A in FIG. 1. Network 314 is an overlay network operating over underlay network 102 in FIG. 1.

Remote network 302 hosts any number of VMs or other suitable hardware and/or software configurations. For example, remote network 302 comprises, comprises VM 304, labeled "VM1", VM 306, labeled "VM2", through VM 308, labeled "VMn". VTEP 310 in remote network 302 is an example of remote endpoint 146A in FIG. 1. VTEP 310, or another suitable hardware and/or software configuration, facilitates communications. VTEP 310 is enabled by TCP/IP encoder functionality 312, which is an example of application 105A, as described herein. VTEP 326 has been enabled by TCP/IP encoder functionality 328, which is an example of application 105B as described herein. Network 314 provides a path for data packets to travel from virtual machine 304 to VTEP 310 to VTEP 326 and finally to virtual machine 320 in remote network 318.

Remote network 318 hosts any number of VMs or other suitable hardware and/or software configurations. For example, remote network 318 comprises, comprises VM 320, labeled "VM1", VM 322, labeled "VM2", through VM 324, labeled "VMn". VTEP 326 in remote network 318 is an example of remote endpoint 146B in FIG. 1. VTEP 326, or another suitable hardware and/or software configuration, facilitates communications. Tunnel 316 provides a path for data packets to travel from source 304 to endpoint 310 to endpoint 326 and finally to target 320 in remote environment 318.

Figure 4:
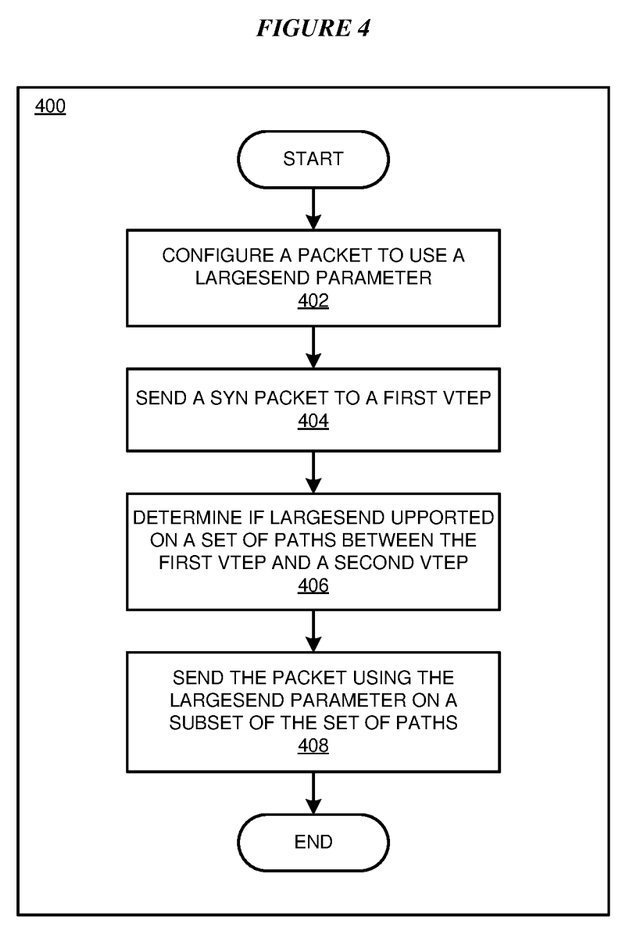
FIG. 4 depicts a flowchart of an example process in tuning TCP largesend parameter in VXLan cloud environments in accordance with an illustrative embodiment.

With reference to FIG. 4, this figure depicts a flowchart of an example process in tuning TCP largesend parameter in VXLan cloud environments in accordance with an illustrative embodiment. Process 400 can be implemented in TCP/IP encoder functionality 312 in FIG. 3.

In an embodiment, an application configures a packet to use a largesend parameter (block 402). In an embodiment, an application sends a SYN packet to a first VTEP (block 404). In an embodiment, an application determines if largesend is supported on a set of paths between the first VTEP and a second VTEP (block 406). In an embodiment, an application sends the packet using the largesend parameter on a subset of the set of paths (block 408). The application ends process 400 thereafter.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving, at a data processing system, a SYN packet from a first component in a first remote network in an overlay network;
determining, in response to receiving the SYN packet, whether a largesend option is supported on a set of paths between the first component and a second component, the second component in a second remote network in the overlay network; and sending, responsive to determining a largesend option is supported on a subset of the set of paths, a SYN-ACK packet on the subset of the set of paths, wherein the SYN packet is received at a first VTEP, the SYN packet sent from a TCP connection running on a first virtual machine;

wherein the determining comprises determining, in response to receiving the SYN packet, whether the largesend option is supported on a set of paths between the first VTEP and the TCP connection; and wherein the SYN-ACK packet is sent from the first VTEP enabling the largesend option.

2. The method of claim 1, further comprising:
gathering a set of configuration information for a first path of the set of paths between the first component and the second component.

3. The method of claim 1, further comprising:
determining a first virtual tunnel endpoint (VTEP) of the first component is on a same logical partition as a second VTEP of the second component.

4. The method of claim 1, wherein largesend avoids segmentation of the packet.

5. The method of claim 1, further comprising:
determining a second subset of the set of paths between the first component and the second component supports the largesend option, the second subset of paths being between the first component and a first VTEP.

6. The method of claim 5, further comprising:
sending, responsive to determining the second subset of the set of paths supports the largesend option, a second packet to a remote VTEP, the second packet indicating the second subset of paths supports the largesend option.

7. The method of claim 6, further comprising:
determining a third subset of the set of paths between the second component and the remote VTEP supports the largesend option.

8. A computer usable program product comprising a computer readable storage device including computer usable code, the computer usable code comprising:
program instructions to receive, at a data processing system, a SYN packet from a first component in a first remote network in an overlay network;
program instructions to determine, in response to receiving the SYN packet, whether a largesend option is supported on a set of paths between the first component and a second component, the second component in a second remote network in the overlay network; and
program instructions to send, responsive to determining a largesend option is supported on a subset of the set of paths, a SYN-ACK packet on the subset of the set of paths,
wherein the SYN packet is received at a first VTEP, the SYN packet sent from a TCP connection running on a first virtual machine;
wherein the determining comprises determining, in response to receiving the SYN packet, whether the largesend option is supported on a set of paths between the first VTEP and the TCP connection; and
wherein the SYN-ACK packet is sent from the first VTEP enabling the largesend option.

9. The computer usable program product of claim 8, further comprising:
program instructions to gather a set of configuration information for a first path of the set of paths between the first component and the second component.

10. The computer usable program product of claim 8, further comprising:
program instructions to determine a first virtual tunnel endpoint (VTEP) of the first component is on a same logical partition as a second VTEP of the second component.

11. The computer usable program product of claim 8, wherein largesend avoids segmentation of the packet.

12. The computer usable program product of claim 8, further comprising:
program instructions to determine a second subset of the set of paths between the first component and the second component supports the largesend option, the second subset of paths being between the first component and a first VTEP.

13. The computer usable program product of claim 12, further comprising:
program instructions to send, responsive to determining the second subset of the set of paths supports the largesend option, a second packet to a remote VTEP, the second packet indicating the second subset of paths supports the largesend option.

14. The computer usable program product of claim 13, further comprising:
program instructions to determine a third subset of the set of paths between the second component and the remote VTEP supports the largesend option.

15. The computer usable program product of claim 8, wherein the computer usable code is stored in a computer readable storage device in a data processing system, and wherein the computer usable code is transferred over a network from a remote data processing system.

16. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to receive, at a data processing system, a SYN packet from a first component in a first remote network in an overlay network;
program instructions to determine, in response to receiving the SYN packet, whether a largesend option is supported on a set of paths between the first component and a second component, the second component in a second remote network in the overlay network; and
program instructions to send, responsive to determining a largesend option is supported on a subset of the set of paths, a SYN-ACK packet on the subset of the set of paths,
wherein the SYN packet is received at a first VTEP, the SYN packet sent from a TCP connection running on a first virtual machine;
wherein the determining comprises determining, in response to receiving the SYN packet, whether the largesend option is supported on a set of paths between the first VTEP and the TCP connection; and
wherein the SYN-ACK packet is sent from the first VTEP enabling the largesend option.

18. The computer system of claim 17, further comprising:
gathering a set of configuration information for a first path of the set of paths between the first component and the second component.

* * * * *